(12) United States Patent
Leroux

(10) Patent No.: US 7,583,835 B2
(45) Date of Patent: Sep. 1, 2009

(54) PROCESS FOR GRIPPING AN OBJECT BY MEANS OF A ROBOT ARM EQUIPPED WITH A CAMERA

(75) Inventor: Christophe Leroux, Versailles (FR)

(73) Assignee: Commissariat a l'Energie Atomique (FR)

( * ) Notice: Subject to any disclaimer, the term of this patent is extended or adjusted under 35 U.S.C. 154(b) by 605 days.

(21) Appl. No.: 11/176,552

(22) Filed: Jul. 6, 2005

(65) Prior Publication Data

US 2006/0008136 A1    Jan. 12, 2006

(51) Int. Cl.
*G06K 9/00*    (2006.01)
(52) U.S. Cl. ................................. 382/153; 382/154
(58) Field of Classification Search ................... 382/153
See application file for complete search history.

(56) References Cited

U.S. PATENT DOCUMENTS

| | | | | |
|---|---|---|---|---|
| 4,731,853 A | * | 3/1988 | Hata et al. | 382/153 |
| 4,799,267 A | * | 1/1989 | Kamejima et al. | 382/153 |
| 4,831,548 A | * | 5/1989 | Matoba et al. | 700/264 |
| 4,835,450 A | * | 5/1989 | Suzuki | 318/568.13 |
| 5,499,306 A | * | 3/1996 | Sasaki et al. | 382/291 |
| 5,579,444 A | * | 11/1996 | Dalziel et al. | 382/153 |
| 5,581,665 A | * | 12/1996 | Sugiura et al. | 700/251 |
| 5,684,531 A | * | 11/1997 | Li et al. | 348/139 |
| 6,101,455 A | * | 8/2000 | Davis | 702/94 |
| 6,272,237 B1 | * | 8/2001 | Hashima | 382/153 |
| 6,642,922 B1 | * | 11/2003 | Noda | 345/419 |
| 7,177,459 B1 | * | 2/2007 | Watanabe et al. | 382/151 |
| 2004/0120550 A1 | * | 6/2004 | Comaniciu | 382/107 |
| 2004/0181362 A1 | * | 9/2004 | Brost et al. | 702/167 |

\* cited by examiner

*Primary Examiner*—Matthew C. Bella
*Assistant Examiner*—Sath V. Perungavoor
(74) *Attorney, Agent, or Firm*—Baker & Hostetler, LLP

(57) ABSTRACT

A reconnaissance process for taking successive images (7, 10) of an object using a camera by pairing optimally points (A, B) into a single movement ($\Delta m$) compatible with the movement of the camera that has taken two images to calculate the position of the object. The points that can be paired belong to the object even if they have been obtained automatically, whereas the background of the image often has a lower number of points making it impossible to pair with the movement ($\Delta m$).

2 Claims, 3 Drawing Sheets

PROCESS FOR GRIPPING AN OBJECT BY MEANS OF A ROBOT ARM EQUIPPED WITH A CAMERA

Figure 1:
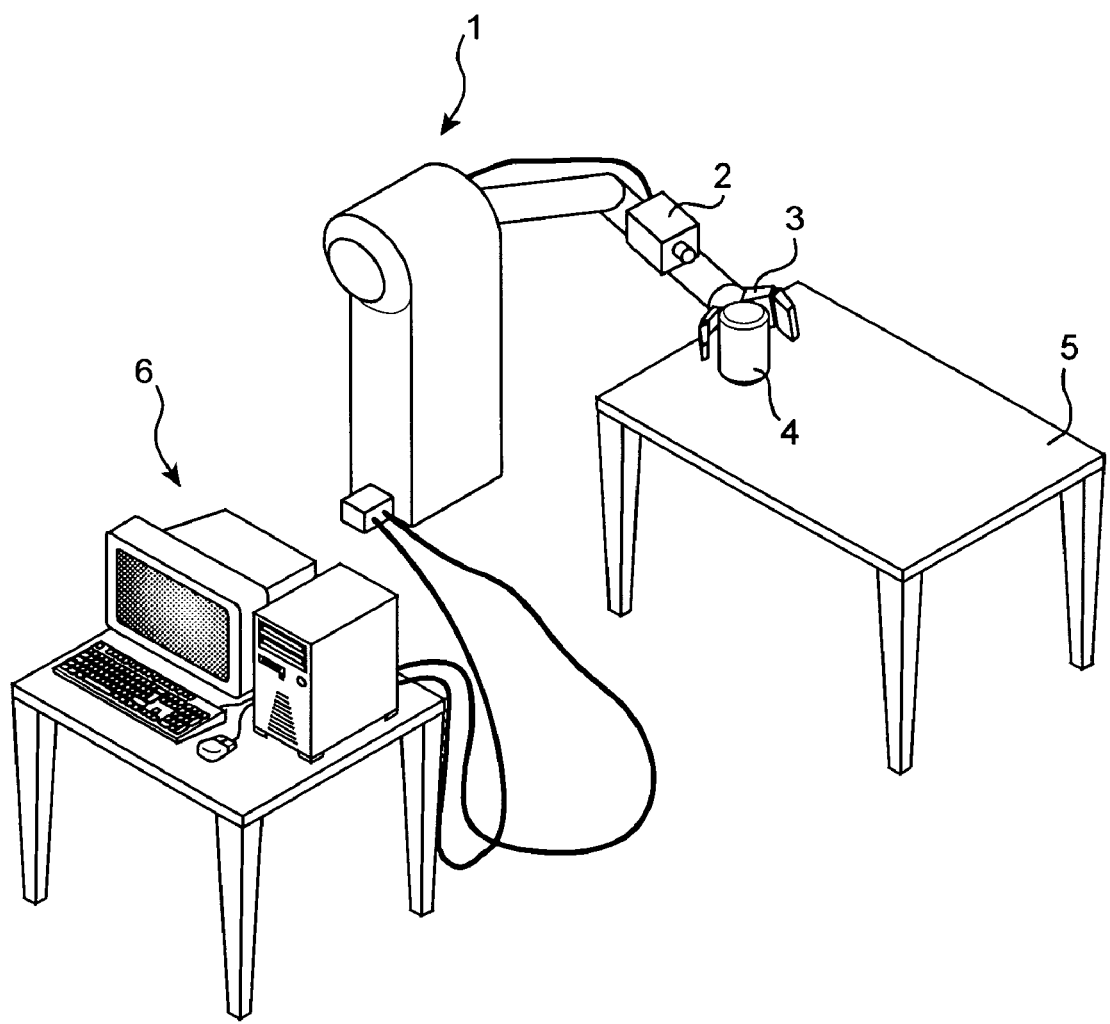

This invention relates to a process for gripping an object with a robot arm equipped with a camera.

The camera takes images of the object to be reached and its environment during the movements of the arm and guides it to the object. A computer is used to locate the object and determine its position with respect to the end of the arm using the images, to calculate the command to be sent to the arm to bring the end to the object to be gripped, and to transmit this command to the arm. The gripping instrument at the end of the arm is closed at the end of the arm movement to grip the object. The commands may be recalculated progressively as the arm moves and new images are taken into consideration.

It is know that certain positional information of the objects in the field of a camera may be deduced from the position of their representation on the image if the parameters of the camera are known, such as the focal length, the shutter angle, or the distortion. This information is however incomplete as a point of the image is associated to a straight projection line of the environment, in any point of which the surface of the object examined may be situated. There are however processes where retro-projection calculations made using additional information provide the position of the object positioned in front of a camera by the positions of points determined from the object in the image: if the computer knows the relatives positions of these points on the object, it can determine the distance and orientation of the object with respect to the camera in addition to its direction. In practice, marker points are used on the object consisting of reflective or stickers whose relative positions on the object are known. By identifying these points and determining their position on the image, the processing computer deduces the distance and the orientation of the object with respect to the camera, in addition to its direction, provided by the projection lines leading to the marker points. These processes are quite efficient but do not concern the gripping of everyday objects for which it cannot be conceived to mark them up; and they fail when unfavourable orientations of the object hide the marker points.

Another common process consists of learning the position of the object, which is indicated by the operator to the computer. The camera permits the position of the object to be adjusted progressively as it becomes detached from the background of the image during the approach of the arm. This process is however very sensitive to errors, the object generally cannot be reached when its position has not been clearly indicated, or if it has moved during the process.

The purpose of the invention is to improve the locating of the object to be gripped during the movement of the arm and the camera. In a chain of images comprising at least two images from the camera, the points are selected using an algorithm in which each of the images, the movements between the selected points of each of the images and the points selected from at least one of the other said images are calculated and polled, one of the movements, polled a majority of times, is selected and attributed to points belonging to the object, and the coordinates of the said points belonging to the object are calculated according to the selected movement and a measured movement of the camera between the images between which the selected movement is observed.

There is therefore no longer a learning process of the position of the object, nor marking, nor even identification of the object or details of it, At most and just possibly simple designation of the object on the initial image, after which the arm moves towards it without any further intervention by the operator.

Figure 2:
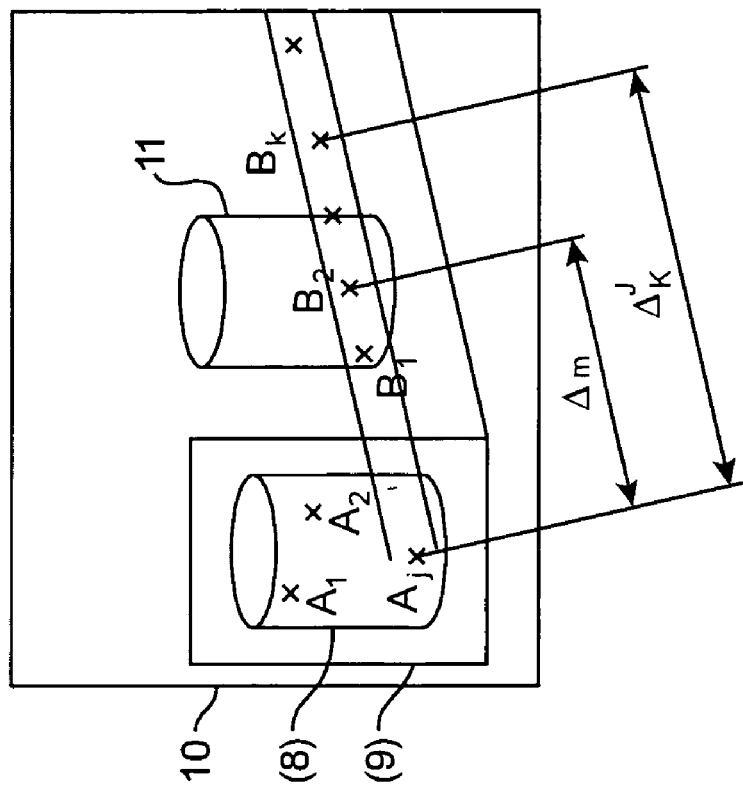
Figure 2:
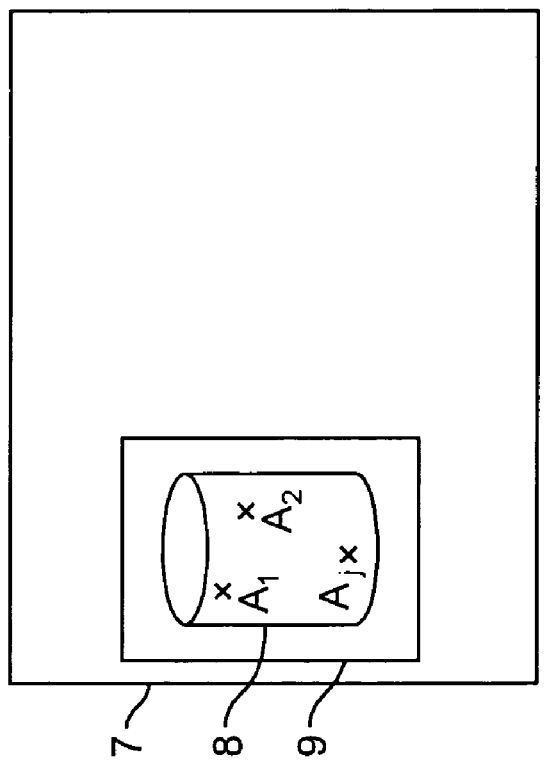
Figure 3:
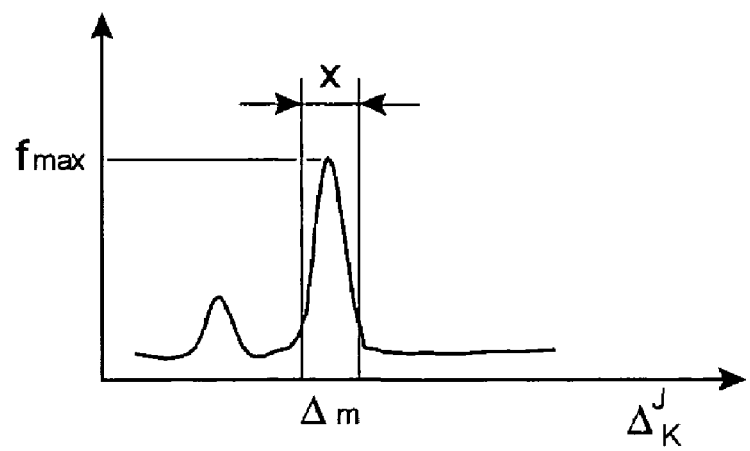
Figure 4:
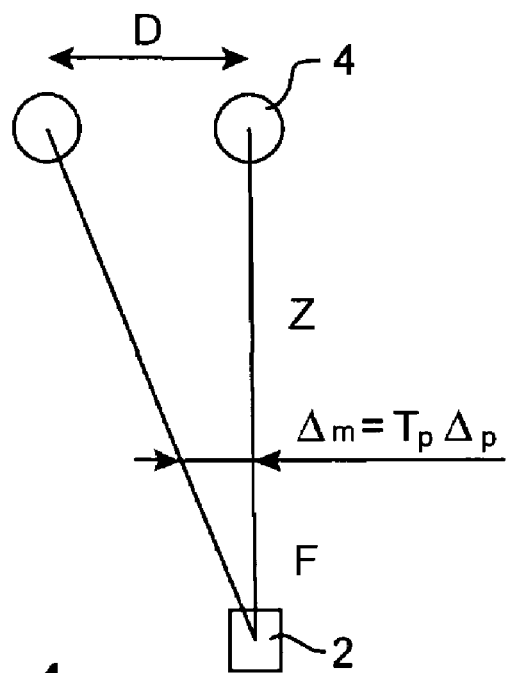

Certain characteristics of the invention will become clearer upon reading the detailed description of the following figures:

FIG. 1 is a general view of the elements of an application of the process,

FIG. 2 explains the method of locating the object on the image,

FIG. 3 explains the selection criterion for the movement of the object from one image to another, and FIG. 4 explains the calculation mode for the position of the object.

One important application of the invention is assistance to handicapped persons. Robot arms whose command only requires very limited physical capacities already exist to help them, but the difficulties mentioned above to command them often mean that they are slow to accomplish their tasks correctly. We have illustrated, in FIG. 1, a robot arm 1 equipped with a camera 2 and finishing on a clamp 3 which in this case has to reach an object such a drink can 4 stood on a table 5. The operator has a computer 6 with a screen and keyboard to command the arm.

The camera 2 takes an image of the environment situated in front of it, which is represented on the left of FIG. 2 at the moment considered. This image of the environment has the reference 7 and comprises in particular an image of the object 8.

The locating process according to the invention is applied. It comprises the selection of a certain number of points on the image 7. Known techniques include the use of Moravec detectors, Harris and Stephens detectors, and the SUSAN filter. They often include an analysis of the image 7 permitting its specific features to be distinguished, such as the edges of the elements its represents, according to the sharp variations in light from one point of the image to another. The points selected may be for example the angles of the separation lines between the elements. It should be pointed out that the selection of the points does not depend on the operator but on the programme alone, and that the operator is not informed of this; however, the operator can limit the selection of the points for this first image 7 to the regions including the image of the object 8 and the surrounding area, by specifying for example a frame 9 outside of which the points selected are discarded. The points finally selected are noted with a letter A followed by a numerical index 1, 2, etc.

A first movement of the arm 1 is made, and the camera 2 takes another image 10 in which the image of the object has the reference 11. The algorithm for selecting the points is used again and provides a new selection of points, noted with the letter B and a numerical index. For the clarity of the explanation, the old image of the object 8 will be shown superimposed, even though it is invisible on this image 10.

The next step consists of polling the movements between the positions of the points A on the old image 7 taken by the camera 2 and the positions of the points B on this image 10. These movements are noted $\Delta jk$ between the point Aj and the point Bk. All of the A points and all of the B points are thus paired by a movement, except just to retain only the movements compatible with an epipolar constraint which depends on the movement of the camera 2 between the shooting of images 7 and 10: we only try to pair to an A point the B points present in a zone where we expect this A point to be now situated according to the movement of the camera 2 what can be estimated according to the relationship of the horizontal and vertical movements of the camera 2 (en X and Y) in the plane of the images, which permits the direction of movement of the image of the object to be estimated on the images taken by neglecting the B points present elsewhere and in particular those which are too far away or in incorrect directions on the image 10.

The use of polar coordinates to estimate the movements thus permits the successive selection according to the angles of the $\Delta$jk movements on the images, then another selection according to the $\Delta$jk values.

Another means of avoiding exhaustive pairings between all of the A and B points would consist of using relaxation methods or pairings obtained by random sampling.

The $\Delta$jk movements between all of the A points and all of the B points in the exhaustive limits calculated are then polled and those whose values are almost identical are grouped together.

We then search for the $\Delta$m value of the most frequent movement for the $\Delta$jk in a tolerance Xa (FIG. 3). This movement $\Delta$m is supposed to be that of the image of the object 8 or 11 between the two images 7 and 10 without all of the A and B points that have been selected having to be necessarily paired. This purely statistical criterion for determining the movement of the image of the object is based on the hypothesis that the object 4 has the most points that will be selected from one image to another and therefore possesses the preponderant content of the images, especially if a criterion for designating an image of the object 9 in the image 7 taken by the camera 2 has been applied. The rest of the images, often composed on background portions, comparatively possess fewer points and also fewer points that could be paired from one image to another as the movements of the camera will highlight the points selected located on the edges of the images for the following image. Furthermore, as the pairs of points that have been able to be paired outside of the object 2 are in different planes, they will be subject to different movements between the images 7 and will therefore be in minority categories of movements. It should also be pointed out that the method provides good results even if the object 4 overlaps the global image or if it is partially hidden, as it applies even if it is not possible to pair certain selected A or B points effectively belonging to the object 4. Once the position of the image of the object 11 is estimated on the following image 10, the $\Delta$m movement selected is used to provide an estimation of the position of the object 4 with respect to the camera 2, as shown by the following equations according to the notes of FIG. 4. The movement of the object 4 with respect to a fixed camera 2, shown in FIG. 4, is equivalent to the actual movement of the camera 2 with respect to the object 4.

We can distinguish the relationship:

$$\Delta_m = T_p \Delta_p$$

where $\Delta$m and $T_p$ are expressed in mm, $\Delta_p$ is the movement in pixels of the object between the two images (without dimensions) and $T_p$ represents the size of a pixel on the image of the camera 2. We can thus calculate the coordinates of the object 4:

$$Z = F(D/(\Delta_p T_p) - 1)$$

Where

Z is the focal length of the camera 2 at the surface of the object 4;

F is the focal length of the lens (in mm);

D is the movement of the camera 2 between the taking of two images (in mm);

$T_p$ is the size of a pixel of the CCD sensor (in mm).

We can then deduce the other coordinates of the object 4:

$$X = X_p T_p (Z+F)/F \text{ and}$$

$$Y = Y_p T_p (Z+F)/F, \text{ where}$$

X is the abscissa of the object in the camera indicator (in mm);

Y is the ordinate of the object in the camera indicator (in mm);

$X_p$ is the abscissa of the object in the image (in pixels, therefore without dimension);

$Y_p$ is the ordinate of the object in the image (in pixels, therefore without dimension);

The method may be applied to chains of three or more images. Each image has characteristic points that may be paired with a point or no points of the previous image and the following image. If a point can be found by pairing on all of the images of a chain, it is more likely that it truly belongs to the object 4, which increases the reliability of the method.

The invention can still be used if the object 4 is moved slightly during the process. It is found in an unexpected position in the image taken after the movement and its position is then recalculated.

The process is used by a programme contained in the computer 6 which is also part of the invention. This programme comprises all of the means necessary to use the images of the camera 2 and drive the arm 1 by means of necessary digital processing and coding of the information.

The invention claimed is:

1. A process for gripping an object (4) by means of a robot arm (1) equipped with a camera (2), the arm making displacements towards the object, comprising the steps of:
   using the camera to take a chain of images (7,10) of an environment which includes the object while the arm makes the displacements:
   a computer performing the following:
   selecting points in each of the chain of images by an algorithm with the chain of images divided into pairs comprising a first image and a second image;
   comparing the first image and the second image of each chain by means of the selected points;
   measuring the displacement of the arm between instants at which the first image and the second image of each chain were taken;
   determining a position of the object with respect to the arm and controlling a next displacement of the arm;
   wherein the selected points are at boundaries of elements of the images with the first image and the second image compared by computing respective distances $\Delta$jk between each points Aj selected in the fist image and each point Bk selected in the second image, polling said distances $\Delta$jk for selecting one of said polled distances represented by a majority distance $\Delta$m appearing the greatest number of times assuming the selected points in the first image and in the second image separated by the majority distance to belong to the object,
   computing the position of the object by means of the majority distance, the displacement of the arm between the first image and the second image and known parameters of the camera and
   wherein the position of the object with respect to the camera is determined as a distance Z from the camera to the object and said distance Z is equal to F(D/$\Delta$pRp)−1), where F is a focal length of a camera lens, $\Delta$pTp is the majority distance and D is a displacement of the arm between the instants at which the first image and the second image were taken.

2. The process according to claim 1, wherein an abscissa X and an ordinate Y of the object with respect to the camera are determined through equation X=XpTp(Z+F)/F and Y=YpTp (Z+F)/F, wherein Z is said distance from the camera to the object, F said focal length, Xp and Yp are an abscissa and an ordinate of the object in one of the images, and Tp is a size of a pixel on said image.

* * * * *